US011636345B2

(12) United States Patent
Bonakdar Sakhi

(10) Patent No.: US 11,636,345 B2
(45) Date of Patent: Apr. 25, 2023

(54) TRAINING GENERATIVE ADVERSARIAL NETWORKS

(71) Applicant: International Business Machines Corporation, Armonk, NY (US)

(72) Inventor: Omid Bonakdar Sakhi, North York (CA)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 16/797,377

(22) Filed: Feb. 21, 2020

(65) Prior Publication Data

US 2021/0264280 A1 Aug. 26, 2021

(51) Int. Cl.
*G06N 3/08* (2023.01)
*G06N 3/084* (2023.01)

(52) U.S. Cl.
CPC .................. *G06N 3/084* (2013.01)

(58) Field of Classification Search
CPC ..... G06N 3/084; G06N 3/0454; G06N 3/0472
See application file for complete search history.

(56) References Cited

U.S. PATENT DOCUMENTS

2019/0130266 A1 5/2019 Cao
2019/0156183 A1* 5/2019 Durham ............... G06N 3/0472
2021/0142106 A1* 5/2021 Quader ................ G06K 9/6271

FOREIGN PATENT DOCUMENTS

CN  107392312 A  11/2017
CN  108388925 A   8/2018

OTHER PUBLICATIONS

Karras et al., "Progressive Growing of GANs for Improved Quality, Stability, and Variation", Published as a conference paper at ICLR 2018, arXiv:1710.10196v3 [cs.NE] Feb. 26, 2018, pp. 1-14 (1 of 2).
Karras et al., "Progressive Growing of GANs for Improved Quality, Stability, and Variation", Published as a conference paper at ICLR 2018, arXiv:1710.10196v3 [cs.NE] Feb. 26, 2018, pp. 15-26 (2 of 2).
Singh et al., "Layer-Specific Adaptive Learning Rates for Deep Networks", arXiv:1510.04609v1 [cs.CV] Oct. 15, 2015, 5 pages.
Srivastava et al., "VEEGAN: Reducing Mode Collapse in GANs using Implicit Variational Learning", 31st Conference on Neural Information Processing Systems (NIPS 2017), Long Beach, CA, USA, arXiv:1705.07761v3 [stat.ML] Nov. 6, 2017, 17 pages.

* cited by examiner

*Primary Examiner* — Jamal Javaid
(74) *Attorney, Agent, or Firm* — David K. Mattheis

(57) ABSTRACT

Improving the training of generative adversarial networks by identifying the input and output layers in the generator network, assigning a gradient multiplier to each layer, and multiplying the gradient by the multiplier during backpropagation and before applying the product of the gradient and multiplier to node weights of the layers.

17 Claims, 5 Drawing Sheets

TRAINING GENERATIVE ADVERSARIAL NETWORKS

BACKGROUND

The disclosure relates generally to training machine learning systems. The disclosure relates particularly to preventing mode collapse and stabilizing the training while training generative adversarial networks.

Generative adversarial networks (GAN) typically include two networks, a generator network and a discriminator network. The generator network creates outputs from input noise. The output is passed as an input to the discriminator network. The discriminator network then classifies that generated output as "real" data or as generated or "fake" data. During training the two networks have an adversarial relationship. The generator network seeks to maximize the value of the error associated with the discriminator network output, while the discriminator network seeks to minimize the value of the error. In a well-trained GAN, the discriminator network succeeds in correctly identifying generated output about 50% of the time and fails about 50% of the time.

The outputs of the generator networks relate to their training. GAN generator networks may be trained to generate images, characters, or other types of output according to the content of the training data set used to train the networks. Training data sets include multiple modes, or elements, such as numeric characters 0-9, alphabetic characters a-z, or images. Real data sets include similar or identical modes or elements. The discriminator is trained to distinguish generator network outputs from real data set modes.

Some training methods are based on a progressive approach for training. It means that at the beginning of the training the two networks are small and generate small images. Layers are added progressively to each network during the training until the network reaches a pre-defined target resolution. Training non-progressive generative adversarial network is a difficult task due to instability of the interaction between the two networks. The difficulty can manifest itself in different forms ranging from the networks not learning at all, being very slow or the well-known problem of mode collapse. Mode collapse occurs during GAN training when the generator network of the GAN becomes fixated on a limited subset of training data modes, or in some cases a single mode of the training data set, and all output from the generator network collapses to that single mode. (As an example, a GAN training to output a character between 0-9 collapses and outputs nothing but the character 4).

During the training of GANs, when gradients arrive at each layer during the back-propagation phase, they are applied to the weights of that layer with a learning rate. This learning rate is pre-defined from the beginning of the training. The learning rate might change or decay but typically the same learning rate is applied for each layer of the network.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable training generative adversarial networks while reducing the likelihood of mode collapse and failure of the networks to converge.

Aspects of the invention disclose methods, systems and computer readable media associated with improving the training of generative adversarial networks by identifying input and output layers in the generator network, assigning a multiplier to the layers after the input layer, including the output layer, and applying a gradient and the multiplier to the nodes of each layer during back-propagation.

In one aspect, methods, systems and computer enabled media associated with the training of generative adversarial networks includes identifying all layers of the generator network, assigning a multiplier to the layers between the input layer and the output layer, where the multiplier decreases for each layer proceeding from the output layer toward the input layer. Further, applying a gradient and the multiplier to the weights of the layer during back-propagation. Identifying layers of the discriminator network, assigning multipliers to the layers, where layers closer to the input of the discriminator have smaller multipliers compared to the layers closer to the output layer. Further, applying a gradient and the multiplier to node weights of the layers during back-propagation.

In one aspect, methods, systems and computer enabled media associated with the training of generative adversarial networks includes identifying layers of the generator network, assigning multipliers to the layers, where a multiplier of about 1 is assigned to the output layer of the generator and a much smaller multiplier is assigned to the input layer and assigning multipliers to each layer between the input layer and the output layer, where the assigned multipliers have values interpolated between the value of the first layer multiplier and the value of the output layer multiplier. Further, applying gradients and the multipliers to the node weights of each layer during back-propagation. Identifying layers of the discriminator network, assigning a multiplier to layers after the input layer. Further, applying a gradient and the multiplier to the node weights of layers in the discriminator network during back-propagation.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
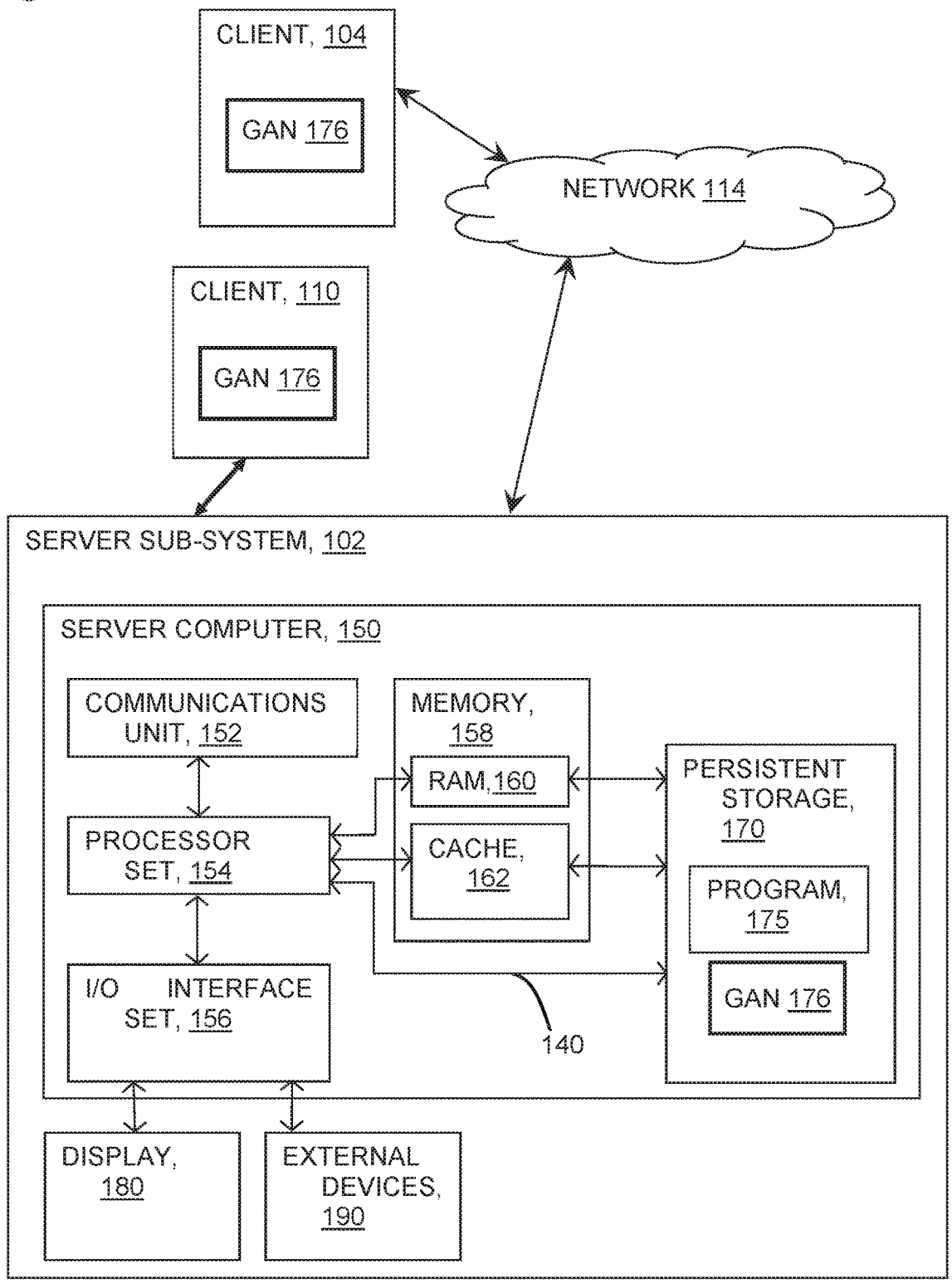
FIG. 1 provides a schematic illustration of a system, according to an embodiment of the invention.

Some embodiments will be described in more detail with reference to the accompanying drawings, in which the embodiments of the present disclosure have been illustrated.

However, the present disclosure can be implemented in various manners, and thus should not be construed to be limited to the embodiments disclosed herein.

In an embodiment, one or more components of the system can employ hardware and/or software to solve problems that are highly technical in nature (e.g., training a generative adversarial network (GAN) system, etc.). These solutions are not abstract and cannot be performed as a set of mental acts by a human due to the processing capabilities needed to train a GAN system, for example. Further, some of the processes performed may be performed by a specialized computer for carrying out defined tasks related to memory operations. For example, a specialized computer can be employed to carry out tasks related to training and using generative adversarial networks.

Generative adversarial networks (GAN) are trained to produce (generate) new content from input data. GAN may be trained to generate characters—alphabetic, numeric, etc., faces, animals, or other content as desired. GAN include generator networks and discriminator networks. GAN generator networks receive a simple random variable input and generate a random variable output which follows a target probability distribution. GAN discriminator networks receive generator network output and classify the input as either real or generated. GAN are adversarial in that the generator and discriminator networks are trained with opposing or adversarial goals. The GAN generator networks are trained seeking to maximize the classification error of the discriminator network as it classifies inputs, while the discriminator networks are concurrently trained seeking to minimize the classification error of the discriminator network.

In an embodiment, each of the generator network and discriminator network consists of a convolutional neural network, a deep convolution neural network or other similar deep learning neural networks structured with paired generator and discriminator networks.

A generator network training data set can be defined as including a fixed number of categories of samples (modes) across the finite number of data instances or samples included in the training set. Mode collapse refers to a scenario during training where the generator network becomes fixated upon a subset of modes, or a single mode, as the generator network learns that outputting this particular subset of modes, or single mode, maximizes the classification error of the discriminator. The result is a generator which repeatedly generates the same mode (character, face, etc.) as its output since this single mode output has the highest discriminator characterization error value. A training method which reduces the likelihood of mode collapse in the GAN is needed.

In an embodiment, training a GAN generator network includes passing a noise vector to the generator and having the generator create an output. In this embodiment, the generator network includes an input layer, a plurality L, of intermediate layers, and an output layer. Each layer includes a number of nodes, each node has an associated weight w, for each iteration of the network training. The generator network may be initialized by assigning random weights to each node and creating an output from the input variable.

The generator network output is passed as input to the discriminator network. The discriminator network classifies the input as either real or generated. Gradient back-propagation is used during training to adjust the node weights of each of the generator and discriminator networks. In an embodiment, training the generator network includes gradient back-propagation to maximize the discriminator error function while discriminator network training includes gradient back-propagation to minimize the discriminator network error function. In this embodiment, to slow the rate of convergence of the generator network upon a single mode, a multiplier is assigned to each layer of the generator network downstream from the input layer. The multiplier term is multiplied by the gradient and current node weights of the respective layers during back-propagation.

Each layer has a unique multiplier. In an embodiment, the first layer after the input layer has a multiplier of at most the value of 1/alpha, where alpha might be the number of samples in the training data set. A smaller value may be used for the multiplier to slow convergence of the generator network further. In this embodiment, the output layer of the generator network has a multiplier value of about 1. The training method determines multiplier values for layers between the first layer after the input layer and the output layer by interpolating L−1 values between 1/alpha and 1 for these layers. Other values may be used for the layer multiplier values.

In an embodiment, the multiplier value assigned to each generator network layer is directly proportional to the distance of the layer to the generator network output layer, with network layers closer to the output layer having larger multiplier values than layers situated further from the network output layer. In an embodiment, each layer multiplier has a value greater than zero and less than or equal to one. In an embodiment, the method uses linear interpolation to determine intermediate layer multiplier values. In an embodiment, the method uses a quadratic interpolation to determine intermediate layer values. In an embodiment, the method uses an exponential interpolation to determine intermediate layer values.

In an embodiment, gradient back-propagation during generator network training adjusts generator network layer node weights according to the discriminator network loss function and the response of the discriminator to the last generator network output. Generator network node weights associated with generator network input and data are adjusted to maximize the discriminator network loss function. In this embodiment, discriminator network layer node weights are also adjusted during discriminator network training according to the gradient back-propagation method in order to minimize the discriminator network loss function for the generator network output of the iteration. In this embodiment, gradient back-propagation includes multiplying the gradient by the node weights as well as by the multiplier for the respective layer. As an example, the node weights of the first layer after the generator network input layer are adjusted by multiplying those weights by the gradient and the 1/alpha multiplier for the first layer. The method uses the gradient-multiplier-node weight product as the node weights for the next iteration of the training.

In an embodiment, the training of the discriminator network also includes the use of additional multiplier terms during the gradient back-propagation of the training phase. In this embodiment, a multiplier is assigned to each layer of the discriminator network according to the location of the respective layer within the discriminator network. The method assigns a multiplier value of 1/alpha, where alpha might be the number of data samples in the training data set, to the first layer after the discriminator network input layer. The method assigns a multiplier value of about 1 to the output layer of the discriminator network.

In an embodiment, the method assigns multiplier values to each layer of the discriminator network after the input layer, up to an including the output layer. In this embodiment, the multiplier value varies in direct proportion to the distance of the layer from the output layer. Layers closer to the output layer have a higher value than layers further from the output layer. In this embodiment, no layer has a multiplier value exceeding that of the output layer. In an embodiment, each multiplier has a value greater than zero and less than or equal to one. In an embodiment, the method uses a linear interpolation function to determine multiplier values for the layers of the discriminator network of the GAN. In an embodiment, the method uses a quadratic interpolation to determine multiplier values for the layers of the discriminator network of the GAN. In an embodiment, the method uses an exponential interpolation function to determine multiplier values for the layers of the discriminator network.

In an embodiment, during training, the layer multipliers of the discriminator network are used as part of the gradient back-propagation to adjust the network's node weights after each iteration classifying generator network outputs as true or generated. The relevant gradient is multiplied by the current node weight and the relevant layer multiplier to determine the new node weight for the next iteration of the training process.

Successfully trained GAN having discriminator performance of about 50% success, and having avoided mode collapse, yield a full range of random outputs across the set of possible modes from the training data set. The generated outputs resemble but are not typically identical to training data set samples.

In an embodiment, the method utilizes cloud or edge cloud resource to train the generator and discriminator networks of the model of the GAN. After training, the GAN resides either locally or on cloud or edge cloud resources for use. In use the GAN generates random output according to the trained distribution function and training data set. E.g., a GAN trained with images of handwritten numeric characters generates images of numeric characters which appear to be handwritten. Similarly, a GAN trained with handwritten alphabetic characters generates images of what appear to be handwritten alphabetic characters, a GAN trained with images of human faces generates images which appear to be human faces. A GAN trained with audio files outputs a similar audio file. In each example, the GAN generates outputs according to the training rather than simply reproducing a sample from the training data set. In each example, the GAN produces output similar to, but not simply selected from the training data set samples.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 may each comprise the GAN machine learning program 176 and the GAN training program (not shown), together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the machine learning program 175, and GAN 176, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., machine learning program 175 and GAN 176, on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
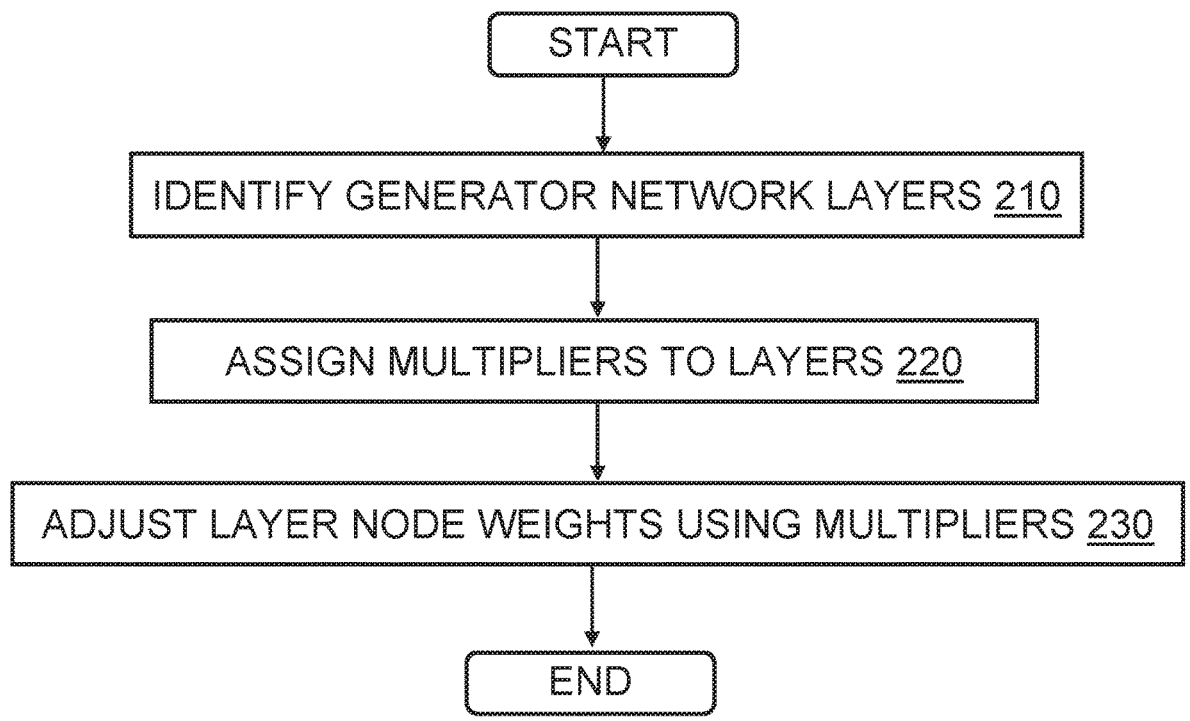
FIG. 2 provides a flowchart depicting an operational sequence, according to an embodiment of the invention.

FIG. 2 provides a flowchart 200, illustrating exemplary activities associated with the practice of the disclosure. After program start, at block 210, the training method of machine learning program 175 identifies the layers of each of the GAN 176 generator and discriminator networks. The identified layers include an input layer, intermediate layers, and an output layer for each network of the GAN 176. At block 220, the method assigns a multiplier to the first layer after the input layer of the generator network. In an embodiment, the method uses the inverse of the number of training data set samples as the multiplier for the first layer after the input layer of the generator network. In an embodiment, the multiplier is the inverse of the number of training data set samples; other values may also be used. In an embodiment, the method of machine learning program 175 assigns a multiplier value of one to the output layer of the generator. In this embodiment, the method interpolates a set of multiplier values between those of the first layer and the output layer. The set includes a multiplier value for each layer between the first layer and the output layer. The values are assigned to the respective layers such that the multiplier values increase with the distance of the layer form the input layer. The method uses a linear, quadratic, exponential or other interpolation function resulting in increasing multiplier values as the distance from the input layer increases.

At block 230, the method of machine learning program 175 adjusts GAN 176 generator network layer node weights by multiplying the current node weight, the gradient for the iteration, and the assigned layer multiplier. The method assigns the product as the new node weight for the next iteration.

In an embodiment, the method of machine learning program 175 uses a similar process during the training of the discriminator network of the GAN 176. Discriminator networks layers are identified, and multipliers are assigned to each network layer after the discriminator network input layer. The method determines layer multipliers by interpolating values between that of the first layer after the inputs layer and the multiplier value of the output layer. In this embodiment, the method assigns a value of 1/alpha to the first layer and a value of one to the output layer. The method interpolates the intervening multiplier values using a linear, quadratic, exponential, or other function.

In an embodiment, the method can be stopped early, according to metrics provided by the user, or the training can be terminated at will. In an embodiment, the method provides the trained GAN input and the GAN generates appropriate outputs which are utilized downstream or provided to a user.

Figure 3:
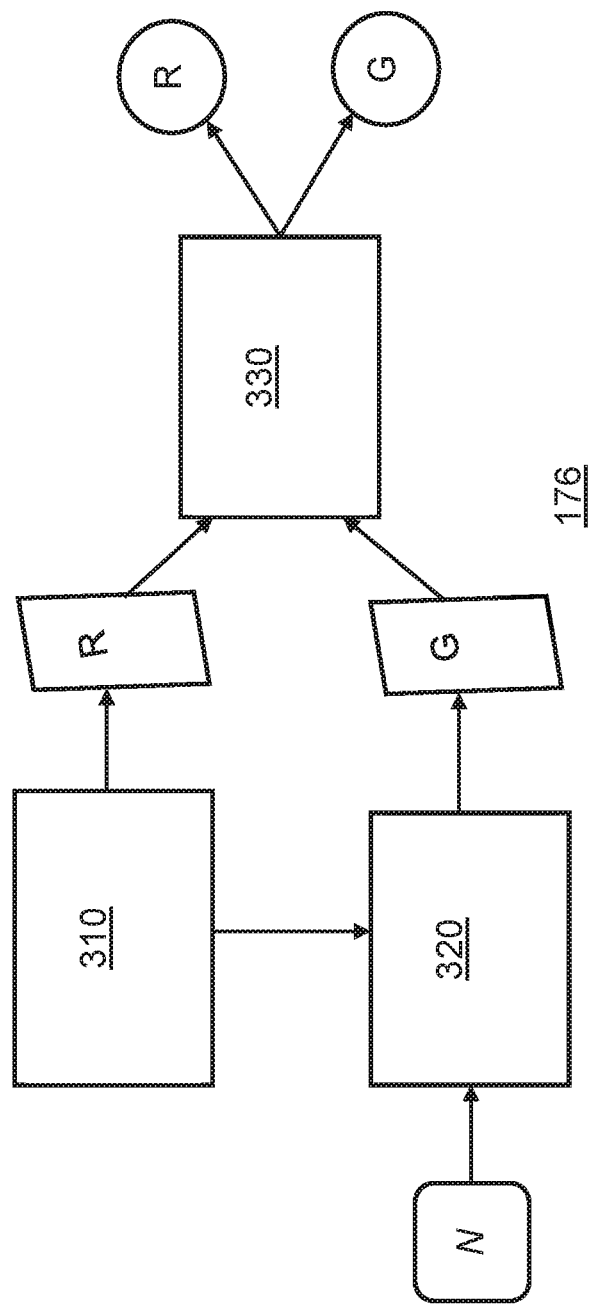
FIG. 3 depicts a generative adversarial network structure.

FIG. 3 provides a schematic illustration of a GAN 176, according to an embodiment of the invention. As shown in the figure noise N passes to generator network 320. The generator network generates an output G, according to the data set 310 used to train generator network 320.

Generator network output G and real outputs R, from data set 310, are passed to discriminator network 330 for consideration. Discriminator network 330 considers each input in turn and classifies the input as either real R, or fake/generated G. A well trained GAN generates outputs from its noise input vector which the discriminator classifies as real 50% of the time.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
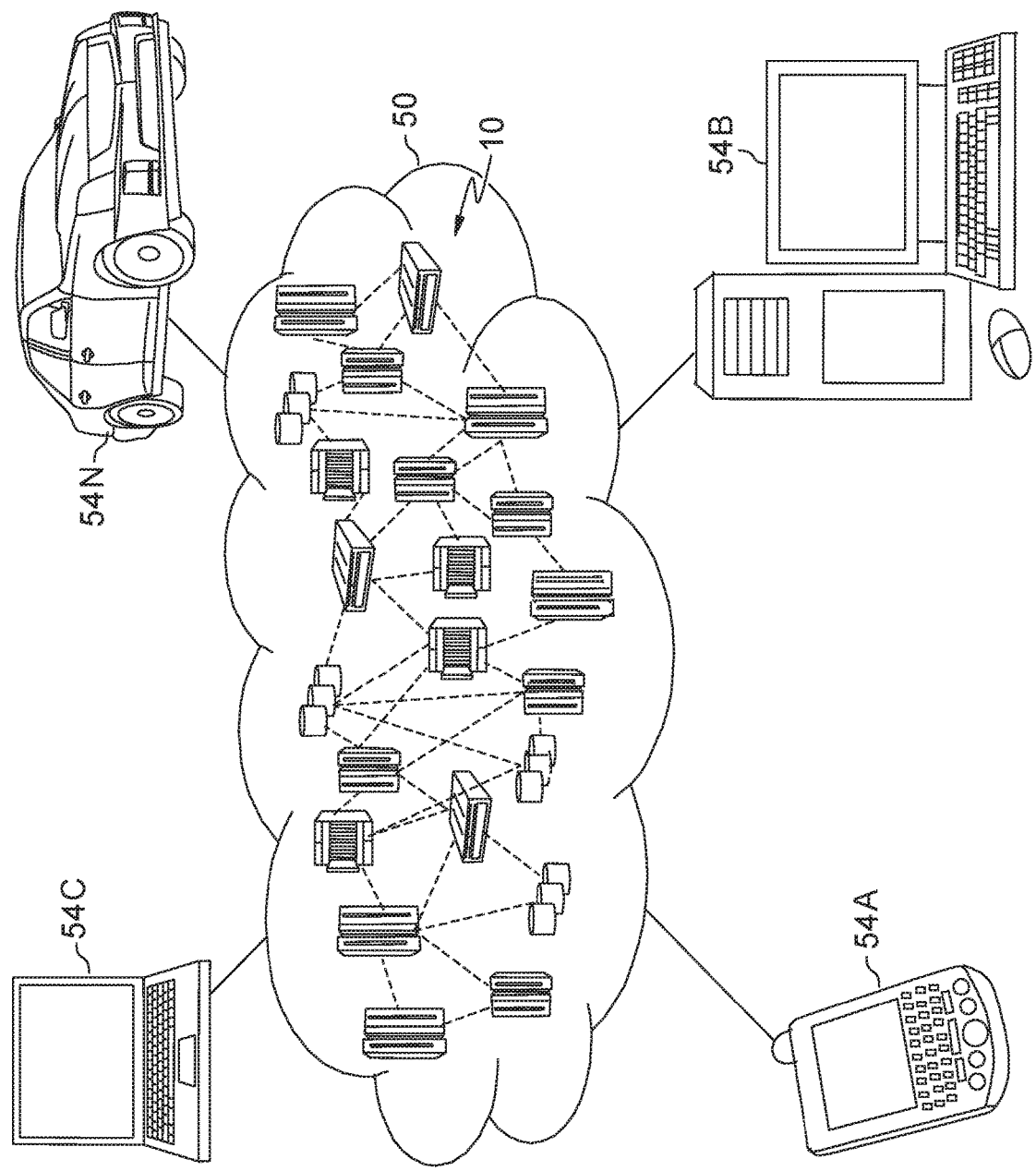
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
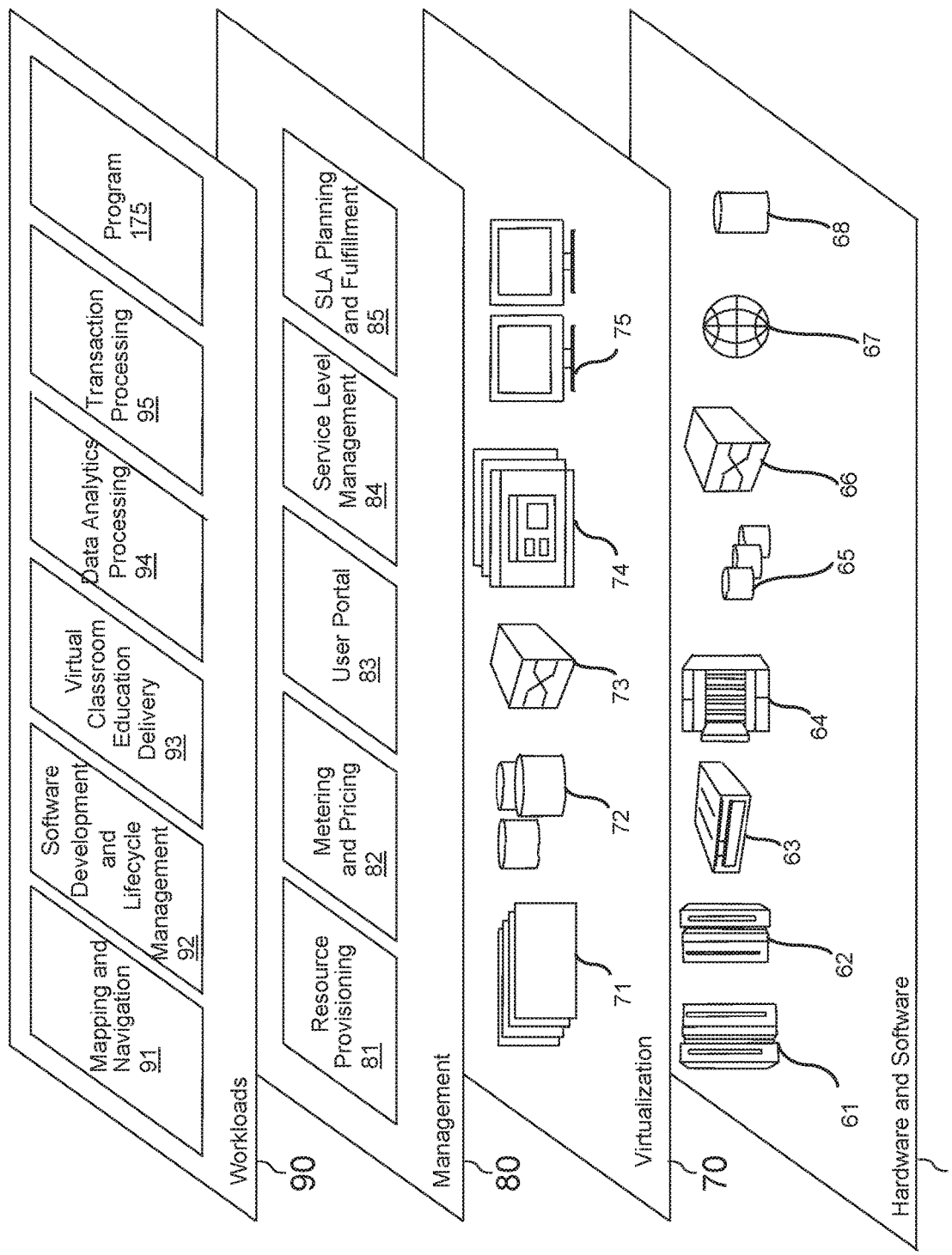
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for training machine learning systems, the method comprising:
   identifying, by one or more computer processors, an input layer in a generator network;
   assigning, by the one or more computer processors, a unique multiplier to a first network layer after the input layer, wherein the unique multiplier comprises a value associated with an inverse of a number of training set data instances;
   applying, by the one or more computer processors, a gradient and the unique multiplier to a node weight of the first network layer during generator network back-propagation;
   training, by the one or more computer processors, the generator network having the node weight;
   providing, by the one or more computer processors, the trained generator network an input;
   generating, by the trained generator network, an output; and
   displaying the output to a user.

2. The computer implemented method according to claim 1, further comprising assigning, by the one or more computer processors, a unique multiplier to each network layer.

3. The computer implemented method according to claim 2, further comprising increasing, by the one or more computer processors, the unique multiplier according to a distance of a network layer from the input layer.

4. The computer implemented method according to claim 1, further comprising assigning a unique multiplier to an output layer of the generator network, wherein the unique multiplier of the output layer of the generator network comprises a value of 1.0.

5. The computer implemented method according to claim 2, wherein the unique multipliers of network layers comprise values interpolated between a unique multiplier for a network layer after the input layer to a unique multiplier for an output layer.

6. The computer implemented method according to claim 1, further comprising:
   identifying, by the one or more computer processors, a discriminator network input layer in a discriminator network;
   assigning, by the one or more computer processors, a discriminator network multiplier to a discriminator network layer after the discriminator network input layer; and
   applying, by the one or more computer processors, a discriminator network gradient and the discriminator network multiplier to a node weight of the discriminator network layer during discriminator network back-propagation.

7. A computer program product for training machine learning systems, the computer program product comprising one or more computer readable storage devices and program instructions collectively stored on the one or more computer readable storage devices, the stored program instructions comprising:
   program instructions to identify an input layer in a generator network;
   program instructions to assign a unique multiplier to a network layer after the input layer, wherein the unique multiplier comprises a value associated with an inverse of a number of training set data instances;
   program instructions to apply a gradient and the unique multiplier to a node weight of the network layer during generator network back-propagation;
   program instructions to train the generator network having the node weight;
   program instructions to provide the trained generator network an input;
   program instructions to generate an output; and
   program instructions to display the output to a user.

8. The computer program product according to claim 7, the stored program instructions further comprising program instructions to assign a unique multiplier to each network layer.

9. The computer program product according to claim 8, the stored program instructions further comprising program instructions to increase the unique multiplier of each network layer according to a distance of the network layer from the input layer.

10. The computer program product according to claim 7, further comprising assigning, by the one or more computer processors, a unique multiplier to an output layer of the generator network, wherein the unique multiplier of the output layer of the generator network comprises a value of 1.0.

11. The computer program product according to claim 7, wherein the unique multipliers of network layers comprise values interpolated between a multiplier for a network layer after the input layer to the multiplier for an output layer.

12. The computer program product according to claim 7, the stored program instructions further comprising:
    program instructions to identify a discriminator network input layer in a discriminator network;
    program instructions to assign a discriminator network multiplier to a discriminator network layer after the discriminator network input layer; and
    program instructions to apply a discriminator network gradient and the discriminator network multiplier to a node weight of the discriminator network layer during discriminator network back-propagation.

13. A computer system for training machine learning systems, the computer system comprising:
    one or more computer processors;
    one or more computer readable storage devices; and
    stored program instructions on the one or more computer readable storage devices for execution by the one or more computer processors, the stored program instructions comprising:
      program instructions to identify an input layer in a generator network;
      program instructions to assign a unique multiplier to a network layer after the input layer, wherein the unique multiplier comprises a value associated with an inverse of a number of training set data instances; and
      program instructions to apply a gradient and the unique multiplier to a node weight of the network layer during back-propagation;
    program instructions to train the generator network having the node weight;
    program instructions to provide the trained generator network an input;
    program instructions to generate an output; and
    program instructions to display the output to a user.

14. The computer system according to claim 13, the stored program instructions further comprising program instructions to assign a unique multiplier to each network layer.

15. The computer system according to claim 14, the stored program instructions further comprising program instructions to increase the unique multiplier of each network layer according to a distance of the network layer from the input layer.

16. The computer system according to claim 13, further comprising assigning, by the one or more computer processors, a unique multiplier to an output layer of the generator network, wherein the unique multiplier of the output layer of the generator network comprises a value of 1.0.

17. The computer system according to claim 13, the stored program instructions further comprising:
- program instructions to identify a discriminator network input layer in a discriminator network;
- program instructions to assign a discriminator network multiplier to a discriminator network layer after the discriminator network input layer; and
- program instructions to apply a discriminator network gradient and the discriminator network multiplier to a node weight of the discriminator network layer during discriminator network back-propagation.

\* \* \* \* \*